United States Patent
Sakamoto et al.

(10) Patent No.: US 12,421,132 B2
(45) Date of Patent: Sep. 23, 2025

(54) SODIUM FERRITE PARTICLE POWDER AND PRODUCTION METHOD THEREOF

(71) Applicant: TODA KOGYO CORP., Hiroshima (JP)

(72) Inventors: Muneyoshi Sakamoto, Otake (JP); Nobuya Shimo, Otake-shi (JP); Eiichi Kurita, Otake-shi (JP)

(73) Assignee: TODA KOGYO CORP., Hiroshima (JP)

( * ) Notice: Subject to any disclaimer, the term of this patent is extended or adjusted under 35 U.S.C. 154(b) by 596 days.

(21) Appl. No.: 17/783,860

(22) PCT Filed: Dec. 4, 2020

(86) PCT No.: PCT/JP2020/045202
§ 371 (c)(1),
(2) Date: Jun. 9, 2022

(87) PCT Pub. No.: WO2021/117623
PCT Pub. Date: Jun. 17, 2021

(65) Prior Publication Data
US 2023/0029005 A1    Jan. 26, 2023

(30) Foreign Application Priority Data

Dec. 10, 2019 (JP) .................... 2019-223136
Feb. 10, 2020 (JP) .................... 2020-020916

(51) Int. Cl.
*C01G 49/00* (2006.01)
*B01J 20/06* (2006.01)

(52) U.S. Cl.
CPC .......... *C01G 49/0027* (2013.01); *B01J 20/06* (2013.01)

(58) Field of Classification Search
CPC ...... C01G 49/0027; C01G 49/00; B01J 20/06; B01J 20/0274; B01J 20/28011;
(Continued)

(56) References Cited

U.S. PATENT DOCUMENTS

2010/0248001 A1* 9/2010 Kuze .................. H01M 50/449
                                                    252/182.1
2011/0159345 A1* 6/2011 Makidera ............ H01M 4/525
                                                    252/182.1
2020/0112023 A1 4/2020 Tonosaki

FOREIGN PATENT DOCUMENTS

CN    101855173 A    10/2010
CN    110461769 A    11/2019
(Continued)

OTHER PUBLICATIONS

Liling Yi, Gang Wang, Yansong Bai, Meihong Liu, Xuan Wang, Min Liu, and Xianyou Wang, The effects of morphology and size on performances of Li2FeSiO4/C cathode materials, Jun. 6, 2017, Journal of Alloys and Compounds, 721, 683-690 (Year: 2017).*
(Continued)

*Primary Examiner* — Daniel C. McCracken
*Assistant Examiner* — Joshua Maxwell Speer
(74) *Attorney, Agent, or Firm* — Knobbe, Martens, Olson & Bear, LLP

(57) ABSTRACT

The sodium ferrite particle powder according to the present invention is characterized in that at least one metal or more selected from the metal group consisting of silicon, aluminum, titanium, manganese, cobalt, nickel, magnesium, copper and zinc is contained in an amount of 0.05 to 20% by weight in terms of the oxide, and the molar ratio of Na/Fe is 0.75 to 1.25.

11 Claims, 2 Drawing Sheets

(58) Field of Classification Search
CPC ............ B01J 20/28045; B01J 20/28059; B01J 20/3078; B01J 20/04; B01J 20/28; B01J 20/30; B01D 51/02; B01D 53/0462; B01D 2253/1124; B01D 2257/504; B01D 2258/0283; C01P 2002/88; C01P 2004/32; C01P 2004/51; C01P 2004/54; C01P 2004/62; C01P 2004/64; C01P 2004/84; C01P 2006/12; C01P 2006/80; Y02C 20/40
See application file for complete search history.

(56) References Cited

FOREIGN PATENT DOCUMENTS

| | | |
|---|---|---|
| EP | 2 323 204 A1 | 5/2011 |
| JP | H05-301023 A | 11/1993 |
| JP | H07-237923 A | 9/1995 |
| JP | 2005-270842 A | 10/2005 |
| JP | 2006-198550 A | 8/2006 |
| JP | 2006-298707 A | 11/2006 |
| JP | 2009-006275 | 1/2009 |
| JP | 2012-139622 A | 7/2012 |
| JP | 2016-003156 A | 1/2016 |
| JP | 2017-109198 A | 6/2017 |
| WO | WO 2018/18155 A1 | 10/2018 |

OTHER PUBLICATIONS

Extended European Search Report, dated Jan. 5, 2024, for European Patent Application No. 20900110.6, in 9 pages.
Grey et al., A Structural Study of the Incorporation of Silica into Sodium Ferrites, $Na_{1-x}[Fe_{1-x}Si_xO_2]$, x = 0 to 0.20, Journal of Solid State Chemistry, vol. 85, pp. 202-219, 1990.
Takasu, et al., Sodium Ferrite/Carbon Dioxide Reactivity for High Temperature Thermochemical Energy Storage, ISIJ International, vol. 59, No. 4, pp. 715-720, 2019.
International Search Report for PCT/JP2020/045202 dated Jan. 12, 2021.
Yanase, Ikuo, "Absorption of loaw concentratins of carbon dioxied at room termperature by inorganic solids using water vapor," Journal of the Society of Inorganic Materials, 2018, Japan, vol. 25, pp. 437-442.
Yanase, et al., "A novel application of α- and β-sodium ferrite as a CO2-capturing solid in air with water vapor," 2018. Journal of CO2 Utilization, vol. 24, pp. 200-209.
Office Action dated Sep. 18, 2023 in Chinese Patent Application No. 202080085797.3 in 13 pages.

* cited by examiner

SODIUM FERRITE PARTICLE POWDER AND PRODUCTION METHOD THEREOF

CROSS REFERENCE TO RELATED APPLICATIONS

This application is the U.S. National Stage Application under 35 U.S.C. § 371 of International Application No. PCT/JP2020/045202, filed Dec. 4, 2020, which claims the benefit of Japanese Patent Application No. JP 2019-223136, filed Dec. 10, 2019 and the benefit of Japanese Patent Application No. JP 2020-020916, filed Feb. 10, 2020. Any and all applications for which a foreign or a domestic priority is claimed is/are identified in the Application Data Sheet filed herewith and is/are hereby incorporated by reference in their entirety under 37 C.F.R. § 1.57.

TECHNICAL FIELD

The present invention provides a sodium ferrite particle powder that fixes carbon dioxide and a production method thereof.

BACKGROUND ART

The United Nations Framework Convention on Climate Change (Paris Convention) was formulated in 2015, aiming at reducing emission of greenhouse gases that are said to be the cause of rising temperature to virtually zero, to suppress the rise in average temperature across the world well below 2° C. In the convention, the government's policy has set a medium-term goal of reducing greenhouse gas emission by 26% compared to the amount released in 2013, by 2030. The greenhouse gas is mainly carbon dioxide generated by the combustion of fossil fuels. It has been reported that the concentration of carbon dioxide in the atmosphere in the 1950s was about 300 ppm, whereas it exceeded 400 ppm in recent years. Research on the capture, storage, and utilization of carbon dioxide is progressing as a powerful trump card for reducing the amount of carbon dioxide released into the atmosphere.

Large-scale generation sources of carbon dioxide include thermal power plants that use coal, heavy oil or natural gas as fuels, boilers in manufacturing factories, and kilns in cement factories. In addition, there are blast furnaces of steel plants that reduce iron oxide with coke, and transport machines such as automobiles, ships, and aircraft that use gasoline, heavy oil or light oil as fuels.

Currently, in large-scale facilities such as thermal power plants, an exhaust gas is brought into contact with an aqueous solution of an amine such as alkanolamine to absorb carbon dioxide contained in the exhaust gas. After that, it is heated to about 120° C. to recover the absorbed carbon dioxide. These attempts have been started on a large scale and have been very effective (Patent Literatures 1 and 2). Since this method uses a liquid absorbent, it has an advantage that the absorbent can be pump-transported. Therefore, it is easy to increase the size. Amine-based carbon dioxide recovery materials are being put to practical use in thermal power plants, and steel plants.

However, since this method uses a dangerous liquid, it is difficult to operate the dangerous liquid in small and medium-sized facilities such as garbage incinerators present in 1800 or more locations in Japan. As a result, carbon dioxide is scarcely fixed and recovered at present. Currently, the total carbon dioxide discharge amount in Japan as a whole is in a slight decrease trend. Therefore, it is expected that carbon dioxide is fixed and recovered by an inexpensive solid which is easy to handle without a dangerous substance such as an amine so that carbon dioxide can be fixed and recovered even in the small and medium-sized facilities described above.

So far, solids carrying the alkanolamine (Patent Literature 3), barium orthotitanate (Patent Literature 4), and lithium ferrite (Patent Literature 5) are known as fixing recovery materials for carbon dioxide in the form of solid.

Sodium ferrite (Patent Literature 6, Non-Patent Literatures 1 and 2) is also known as a fixing recovery material for carbon dioxide. Among them, in the layered rock salt structured (trigonal system) α-sodium ferrite, carbon dioxide and sodium react topochemically. That is, during the reaction with carbon dioxide, α-sodium ferrite becomes a mixed phase of $Na_{1-x}FeO_2$ and sodium carbonate. Therefore, it has been reported that the above-described reaction rate is fast and the carbon dioxide absorption/release repeating performance by the reaction is excellent. On the other hand, it has been reported that since sodium reacts with carbon dioxide in the orthorhombic β-sodium ferrite, the crystalline phase of β-sodium ferrite absorbs more carbon dioxide than the crystalline phase of α-sodium ferrite.

In general, the formula for reacting sodium ferrite with carbon dioxide can be described as $NaFeO_2 + \frac{1}{2}CO_2 \rightarrow \frac{1}{2}Na_2CO_3 + \frac{1}{2}Fe_2O_3$ when the gas does not contain water vapor, while can be described as $NaFeO_2 + CO_2 + \frac{1}{2}H_2O \rightarrow NaHCO_3 + \frac{1}{2}Fe_2O_3$ when the gas contains water vapor. Therefore, it has an ability to adsorb and desorb theoretically up to 18 to 30% by weight of carbon dioxide with respect to sodium ferrite.

CITATION LIST

Patent Literature

[Patent Literature 1] Japanese Laid-Open Patent Publication No. H5-301023
[Patent Literature 2] Japanese Laid-Open Patent Publication No. 2009-6275
[Patent Literature 3] Japanese Laid-Open Patent Publication No. 2012-139622
[Patent Literature 4] Japanese Laid-Open Patent Publication No. 2006-298707
[Patent Literature 5] Japanese Laid-Open Patent Publication No. 2005-270842
[Patent Literature 6] Japanese Laid-Open Patent Publication No. 2016-3156

Non-Patent Literature

[Non-Patent Literature 1] I. Yanase, S. Onozawa, K. Ogasawara, H. Kobayashi, J. CO2 Utilization, Vol. 24, 2018, pp. 200-209
[Non-Patent Literature 2] Ikuo Yanase, Journal of the Society of Inorganic Materials, Japan, Vol. 25, 2018, pp. 437-442

SUMMARY OF INVENTION

Technical Problem

As mentioned above, carbon dioxide fixing recovery materials made from solid, especially from non-hazardous inorganic materials are expected. However, while the current fixing recovery of carbon dioxide using an aqueous amine solution is performed at about 120° C., in the fixing recovery material for carbon dioxide using an inorganic material such as barium orthotitanate (Patent Literature 4) or lithium ferrite (Patent Literature 5), carbon dioxide was adsorbed and desorbed in a temperature range of 200° C. or higher, thus, it was inferior to that using an aqueous amine solution, in view of an energy cost.

That is, the ones described in Patent Literatures 1 and 2 use an aqueous amine solution as a fixing recovery material for carbon dioxide, which is advantageous for large-sized facilities such as thermal power plants, but they were not suitable for small and medium-sized facilities that emit carbon dioxide.

The material described in Patent Literature 3 is also a fixing recovery material for carbon dioxide containing alkanolamine, that is, alkanolamine which is a dangerous substance is used. Therefore, it is not suitable for small and medium-sized facilities because there is a concern about elution of amine components.

The material described in Patent Literature 4 uses a $Ba_2TiO_4$-based composite oxide as a fixing recovery material for carbon dioxide. However, since the heating temperature in the carbon dioxide release step is 800 to 1000° C., it is disadvantageous as a heat cost.

The material described in Patent Literature 5 uses a composite oxide containing lithium and iron as a fixing recovery material for carbon dioxide. However, since the carbon dioxide fixing recovery temperature is 500° C. and the emission temperature is 700° C., it is disadvantageous as a heat cost.

In Patent Literature 6 and Non-Patent Literatures 1 and 2, fixing recovery of carbon dioxide at room temperature has been reported, and a porous body has also been reported. However, there is no description about the moldability and processability of the material itself.

Therefore, the present invention has an object of providing a sodium ferrite particle powder in which carbon dioxide can be fixed in a temperature range from room temperature to 100° C. and the fixed carbon dioxide can be recovered by heating at 200° C. or lower, and which is excellent in moldability and processability, and providing a method for producing the particle powder.

Solution to Problem

In order to achieve the above object, the present inventors have intensively studied and resultantly found that carbon dioxide can be fixed in a temperature range from room temperature to 100° C. and the fixed carbon dioxide can be recovered at 200° C. or lower, by using a sodium ferrite particle powder having predetermined physical properties and composition ratio, leading to completion of the present invention.

Specifically, the sodium ferrite particle powder according to the present invention is characterized in that at least one metal or more selected from the metal group consisting of silicon, aluminum, titanium, manganese, cobalt, nickel, magnesium, copper and zinc is contained in an amount of 0.05 to 20% by weight in terms of the oxide, and the molar ratio of Na/Fe of 0.75 to 1.25.

The metal can be solid-solved in the produced sodium ferrite particles or present on the surface of the particles while inhibiting the crystal growth of the sodium ferrite particles. Therefore, the sodium ferrite particles according to the present invention containing the metal can have an excellent property of adsorbing carbon dioxide in a gas, confining it in a solid, and releasing carbon dioxide by heating. Further, the metal has a catalytic action, so that the carbon dioxide fixing recovery ability can also be improved. Further, since the particle powder according to the present invention has a molar ratio of Na/Fe of 0.75 to 1.25, it can contain a large amount of sodium ferrite crystal phase, and the carbon dioxide fixing recovery performance is improved, and the proportion of Na is not excessively high, hence, alkaline components such as NaOH and $Na_2CO_3$ which are by-products that cause gelation of a paint when the particle powder is made into the paint are less likely to remain, thus, a high dispersibility paint can be obtained. Combined with these characteristics, carbon dioxide can be fixed in a temperature range from room temperature to 100° C. and the fixed carbon dioxide can be recovered at 200° C. or lower, according to the sodium ferrite particle powder according to the present invention.

In the sodium ferrite particle powder according to the present invention, it is preferable that at least one metal or more selected from the metal group consisting of silicon, aluminum, titanium, manganese, cobalt, nickel, copper and zinc is contained in an amount of 0.05 to 1% by weight in terms of the oxide.

According to the sodium ferrite particle powder according to the present invention, the metal can be solid-solved in the generated sodium ferrite particles or present on the particle surface while inhibiting the crystal growth of the sodium ferrite particles. This makes it possible to have excellent performance of fixing carbon dioxide in a temperature range from room temperature to 100° C. and recovering carbon dioxide at 200° C. or lower. Further, since the metal has a catalytic action, the carbon dioxide fixing recovery ability originally possessed by sodium ferrite can be remarkably improved.

The sodium ferrite particle powder according to the present invention preferably contains at least one metal or more selected from the metal group consisting of aluminum, magnesium, silicon, titanium and zinc in an amount of more than 1% by weight and 20% by weight or less in terms of the oxide.

According to the sodium ferrite particle powder according to the present invention, the metal can be solid-solved in the generated sodium ferrite particles or present on the particle surface while inhibiting the crystal growth of the sodium ferrite particles. This makes it possible to have excellent performance of fixing carbon dioxide in the temperature range from room temperature to 100° C. and recovering carbon dioxide at 200° C. or lower. Further, since the metal has a catalytic action, the carbon dioxide fixing recovery ability originally possessed by sodium ferrite can be remarkably improved.

In the sodium ferrite particle powder according to the present invention, it is preferable that the axial ratio of the average major axis diameter to the average minor axis diameter of the primary particles is 1 to 2.

Since the particle powder has a small axial ratio of the average major axis diameter to the average minor axis diameter of the primary particles of 1 to 2 and has a shape close to a sphere, it can be a particle powder which has high dispersibility, in which the primary particles are less likely to aggregate, and which is excellent in moldability and process ability.

The sodium ferrite particle powder according to the present invention preferably has a powder pH value of 8 to 14.

When the pH value of the powder is 8 to 14, since the sodium ferrite particle powder according to the present invention is basic, it becomes easy to catch carbon dioxide which is weakly acidic. Further, as described above, alkaline components such as NaOH and $Na_2CO_3$ which are by-products that cause gelation of the paint are less likely to remain, so that the paint can be used as a paint having high dispersibility.

The method for producing a sodium ferrite particle powder according to the present invention is characterized by containing a step of mixing an iron oxide fine particle powder, a particle powder made of the sodium raw material, and at least one metal or more compound selected from the metal group consisting of silicon, aluminum, titanium, manganese, cobalt, nickel, magnesium, copper and zinc, and reacting them at a temperature of 150 to 500° C. in the solid phase.

In the method for producing a sodium ferrite particle powder according to the present invention, a solid and a solid are mixed, and the elements are moved and reacted without a solvent, namely, a solvent as a reaction mother liquor is not used, so that wastes such as a solvent when applied to the liquid phase reaction can be suppressed. In particular, in the case of a solid phase reaction at a low temperature, the reaction can be extremely concentrated, so that the energy cost can be kept low. Therefore, according to the method for producing a sodium ferrite particle powder according to the present invention, a sodium ferrite particle powder capable of absorbing carbon dioxide at room temperature and discharging the absorbed carbon dioxide at 200° C. or lower and having excellent moldability and processability can be produced.

The method for producing a sodium ferrite particle powder according to the present invention is characterized by containing a step of mixing a particle powder made of the sodium raw material with an iron oxide particle powder containing at least one metal or more selected from the metal group consisting of silicon, aluminum, titanium, manganese, cobalt, nickel, magnesium, copper and zinc in the form of an oxide, and reacting them at a temperature of 150 to 500° C. in the solid phase.

In the method for producing a sodium ferrite particle powder according to the present invention, a solid and a solid are mixed, the elements are moved and reacted not via a solvent, and a solvent as a reaction mother liquor is not used, so that wastes such as a solvent when applied to the liquid phase reaction can be suppressed. In particular, in the case of a solid phase reaction at low temperature, an extremely high concentration reaction can occur, so that the energy cost can be kept low. Therefore, according to the method for producing a sodium ferrite particle powder according to the present invention, a sodium ferrite particle powder capable of fixing carbon dioxide in a temperature range from room temperature to 100° C. and recovering the carbon dioxide by heating at 200° C. or lower, and having excellent moldability and processability can be produced.

Advantageous Effects of Invention

The sodium ferrite particle powder according to the present invention is a non-hazardous inorganic material, and can fix carbon dioxide in a temperature range from room temperature to 100° C., and recover the fixed carbon dioxide by heating at 200° C. or lower. Further, since the particle powder has excellent dispersibility after being made into a paint, it is suitable as a material having excellent moldability and processability.

DESCRIPTION OF EMBODIMENTS

Figure 1:
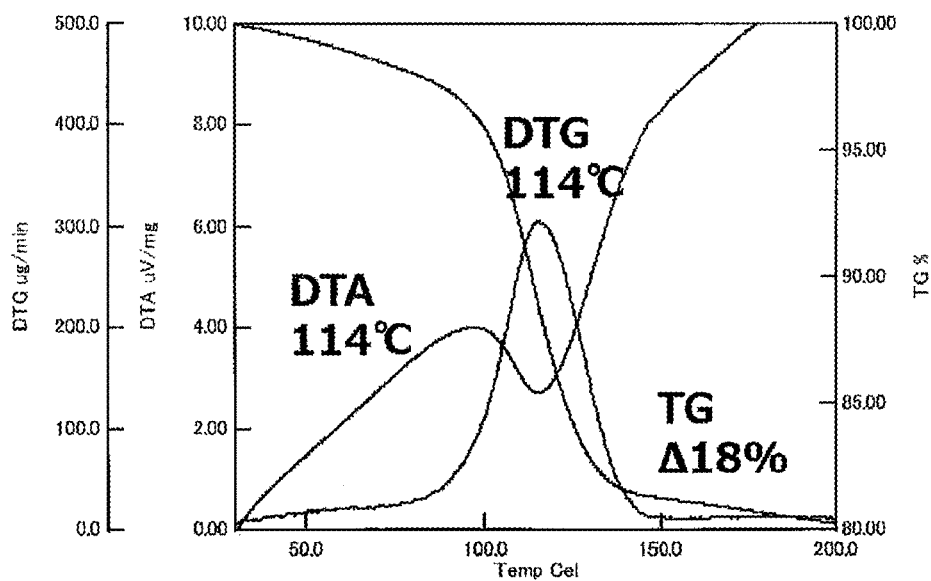
FIG. 1 is a result of thermogravimetric analysis after fixing carbon dioxide with the sodium ferrite particle powder obtained in Example 1.

The configuration of the present invention will be described in more detail as follows.

The carbon dioxide fixing recovery material according to an embodiment of the present invention will be described.

In the sodium ferrite particle according to the present embodiment, the amount of at least one metal selected from the metal group consisting of silicon, aluminum, titanium, manganese, cobalt, nickel, magnesium, copper and zinc is 0.05 to 20% by weight in terms of the oxide. In the case of the above-described range of % by weight, the carbon dioxide fixing recovery performance may be enhanced in some cases. Preferably, the above-described range of % by weight is 0.1 to 18% by weight.

The sodium ferrite particle powder according to the embodiment of the present invention has a molar ratio of Na/Fe of 0.75 to 1.25. If the molar ratio of Na/Fe is less than 0.75, the powder will have a low content of sodium ferrite particles to be produced, and the carbon dioxide fixing recovery performance will be inferior. Further, when the molar ratio of Na/Fe exceeds 1.25, a large amount of alkaline components such as NaOH and $Na_2CO_3$ which are by-products remain. The alkaline component is also a cause of gelation of the paint, and it is hard to say that a highly dispersible paint can be formed, and it is hard to say that it is a particle powder having excellent moldability and processability. More preferably, the molar ratio of Na/Fe is 0.80 to 1.20, and further preferably 0.90 to 1.10.

In the sodium ferrite particle powder according to the present embodiment, the amount of at least one metal or more selected from the metal group consisting of silicon, aluminum, titanium, manganese, cobalt, nickel, copper and zinc is preferably 0.05 to 1% by weight in terms of the oxide. In the case of the above-described range of % by weight, the carbon dioxide fixing recovery performance may be enhanced in some cases. More preferably, the above-described range of % by weight is 0.1 to 0.8% by weight.

When the sodium ferrite particle powder according to the present embodiment contains 0.05 to 1% by weight of the metal, it preferably contains 70% by weight or more of the crystal phase of α-sodium ferrite. The compound having the α-sodium ferrite crystal is a layered compound in which iron, oxygen, and sodium are arranged in layers, and oxygen hexagonal lattices parallel to the layers are arranged in a pattern of . . . ABCABC . . . Sodium ions between the oxygen hexagonal lattices move to the surface of α-sodium ferrite particles and react with carbon dioxide. Therefore, this reaction is said to be a topochemical reaction while maintaining the shape of α-sodium ferrite particles. It is preferable to contain a large amount of α-sodium ferrite crystal phase because it is excellent in the repeatability of fixing recovery of carbon dioxide. More preferably, the content of the crystal phase of α-sodium ferrite is 75% by weight or more, and further preferably 80% by weight or more.

When the sodium ferrite particle powder according to the present embodiment contains 0.05 to 1% by weight of the metal, it preferably contains 2 to 25% by weight of the crystal phase of β-sodium ferrite. In the crystal phase of β-sodium ferrite, oxygen hexagonal lattices are arranged in a pattern of . . . ABABAB . . . . In addition, the volume of β-sodium ferrite per mole is expected to be 1.3 times higher than that of α-sodium ferrite. Therefore, it is preferable that the ratio of α-sodium ferrite to β-sodium ferrite is appropriately adjusted according to the purpose. More preferably, the amount of the crystal phase of β-sodium ferrite is 3 to 22% by weight, and further preferably 5 to 20% by weight.

In the sodium ferrite particle powder according to the present embodiment, the amount of at least one metal or more selected from the metal group consisting of aluminum, magnesium, silicon, titanium and zinc is preferably more than 1% by weight and 20% by weight or less in terms of the oxide. In the case of the above-described range of % by weight, the carbon dioxide absorption performance may be enhanced in some cases. More preferably, the above-described range of % by weight is 1.2% by weight or more and 18% by weight or less.

When the sodium ferrite particle powder according to the present embodiment contains the metal in an amount of more than 1% by weight and 20% by weight or less, it is preferable that the sodium ferrite particle powder contains 50% by weight or more of the crystal phase of β-sodium ferrite. As described above, the volume of β-sodium ferrite per mole is preferably 1.3 times higher than that of α-sodium ferrite. More preferably, the amount of the crystal phase of β-sodium ferrite is 55% by weight or more, and further preferably 60% by weight or more. The upper limit is about 98% by weight.

When the sodium ferrite particle powder according to the present embodiment contains the metal in an amount of more than 1% by weight and 20% by weight or less, it is preferable that the sodium ferrite particle powder contains 2 to 50% by weight of the crystal phase of α-sodium ferrite. As described above, it is preferable to contain a large amount of α-sodium ferrite crystal phase because it is excellent in the repeatability of carbon dioxide absorption. More preferably, the amount of the crystal phase of α-sodium ferrite is 5 to 48% by weight, and further preferably 10 to 45% by weight.

The sodium ferrite particle powder according to this embodiment preferably has a powder pH of 8 to 14. Since the powder pH is 8 or more basic, it is easy to catch carbon dioxide which is weakly acidic. On the other hand, when the powder pH exceeds 14, gelation of the paint occurs, and it is difficult to achieve high dispersibility. The powder pH is preferably 8.2 to 13.5, more preferably 8.4 to 13, and further preferably 9 to 13.

The sodium ferrite particle powder according to this embodiment preferably has a BET specific surface area of 2 to 7 $m^2/g$. When the BET specific surface area is less than 2 $m^2/g$, it becomes difficult to come into contact with carbon dioxide contained in the gas, and the carbon dioxide absorption performance becomes low. Further, when the BET specific surface area exceeds 7 $m^2/g$, industrial production thereof becomes difficult. More preferably, the BET specific surface area is 2.1 to 6.5 $m^2/g$, more preferably 2.6 to 6.0 $m^2/g$, and further preferably 3.0 to 6.0 $m^2/g$.

The sodium ferrite particle powder according to this embodiment preferably has an average primary particle diameter of 50 to 1000 nm. If it is less than 50 nm, industrial production becomes difficult. Further, if it exceeds 1000 nm, the carbon dioxide absorption performance becomes low. The average primary particle size is preferably 100 to 700 nm, more preferably 100 to 500 nm.

The sodium ferrite particle powder according to this embodiment has an axial ratio (average major axis diameter/average minor axis diameter) of primary particles of 1.0 to 2.0. When the axial ratio of the primary particles exceeds 1, the primary particles tend to aggregate with each other, and it becomes difficult to maintain a highly dispersible state after coating. As a result, it cannot be said that the particle powder has excellent moldability and process ability. Further, the axial ratio cannot be less than 1. More preferably, the axial ratio of the primary particles is 1.05 to 1.9, and further preferably 1.1 to 1.8.

When the sodium ferrite particle powder according to the present embodiment is applied as a carbon dioxide fixing recovery material, carbon dioxide can be selectively adsorbed from a gas containing carbon dioxide and fixed. The adsorption temperature is about 0° C. to 100° C., which is the room temperature to the exhaust gas outlet temperature. More preferably, it is about 0° C. to 50° C. Since no additional heating from the outside is required, the energy cost for adsorption can be kept low (the above is the carbon dioxide fixing step).

In the sodium ferrite particle powder according to the present embodiment, it is preferable that carbon dioxide incorporated in the above-mentioned carbon dioxide fixing step is desorbed at a temperature of 200° C. or lower in a gas atmosphere containing no carbon dioxide, to recover carbon dioxide. Since the desorption temperature is as low as 200° C. or lower, the energy cost for desorption can be kept low (the above is the carbon dioxide recovery step).

The sodium ferrite particle powder according to the present embodiment can be used as it is, but when it is brought into contact with a large amount of carbon dioxide, the superficial velocity of the adsorption tower can be controlled. That is, the sodium ferrite particle powder may be granulated or supported on a carrier to form a spherical molded body having a diameter of about 100 μm to 10 mm More preferably, it is a spherical molded product having a diameter of 200 μm to 7 mm. At this time, it is preferable that the molded body containing the sodium ferrite particle powder has a specific surface area of 1 to 1000 $m^2/g$ so that the contact with carbon dioxide is not hindered even if the diameter of the molded body is increased. Further, the shape of the molded body is not particularly limited, but is preferably spindle shape, rectangular parallelepiped shape, dice-shape, or cylindrical shape, in addition to the spherical shape. In addition, a sodium ferrite particle powder can be processed into a paint and applied onto mesh, non-woven fabric, and honeycomb so that carbon dioxide can be fixedly recovered, or a sodium ferrite particle powder can be filled in a column to give a filter so that carbon dioxide can be fixedly recovered.

Next, a method for producing the sodium ferrite particle powder according to an embodiment of the present invention will be described.

The sodium ferrite particle powder according to the present embodiment can be obtained by mixing an iron oxide particle powder, a particle powder made of the sodium raw material, and at least one metal or more compound selected from the metal group consisting of silicon, aluminum, titanium, manganese, cobalt, nickel, magnesium, copper and zinc, and reacting them at a temperature of 150 to 500° C. in the solid phase.

When the above-mentioned iron oxide particle powder and the particle powder of the sodium raw material were mixed, and then the metal group was further mixed and subjected to a solid phase reaction, the metal group component tended to suppress the growth of the primary particles of sodium ferrite. Therefore, it becomes a particle powder having a large BET specific surface area, which is preferable as a carbon dioxide absorbent. Further, as a characteristic of the solid phase reaction, the crystal growth of sodium ferrite tends to be isotropic, so that the axial ratio of the primary particles tends to be suppressed.

The amount of the metal such as silicon, aluminum, titanium, manganese, cobalt, nickel, copper and zinc to be added and calcinated is preferably more than 1% by weight and 20% by weight or less in terms of the oxide with respect to iron oxide. This is because, as described above, the carbon dioxide absorption performance may be enhanced. The content of the metal is more preferably 1.1% by weight to 19% by weight, and further preferably 1.2% by weight to 18% by weight. As the metal, oxides, hydroxides, chlorides and carbonates of various metals may be used as raw materials. Moreover, a composite of the above mentioned metals may be used.

For the iron oxide particle powder, hematite, magnetite, maghemite, and goethite can be used. When iron oxide particle powder and sodium raw material particle powder are mixed and calcinated, α-sodium ferrite is usually produced at 600° C. and β-sodium ferrite is produced at 800° C. (Non-Patent Literature 1). When a group of metals is mixed with this system and subjected to a solid phase reaction, sodium ferrite is formed at a low temperature of 150 to 500° C., and further, there is formed a composition with more β-sodium ferrite crystal phase than α-sodium ferrite crystal phase. By addition of this metal group, fine sodium ferrite is formed. Further, it is more preferable that the carbon dioxide absorption performance is also improved by forming a large amount of β-sodium ferrite. Further, since it is calcinated at a temperature lower than usual, sintering is less likely to occur, and it becomes a particle powder having a large BET specific surface area, which is preferable as a carbon dioxide absorbent.

The shape of the iron oxide particle powder can be selected from needle shape, spindle shape, spherical shape, tetrahedron, hexahedron, and octahedron.

As the particle size of the iron oxide particle powder, any size from 10 nm to 1 μm can be selected.

As the particle powder of the sodium raw material, sodium nitrite, sodium sulfate, sodium carbonate, sodium hydrogen carbonate, and sodium hydroxide can be used. However, considering industrial use, sodium nitrite and sodium sulfate, which may generate toxic nitrite gas or sulfurous acid gas during production should be avoided.

In general, the solid phase reaction is a synthetic method in which a solid and a solid are mixed and the elements are moved and reacted without a solvent. Since no solvent is used as a reaction mother liquor, wastes such as a solvent when used for the liquid phase reaction can be suppressed. Further, in the case of the solid phase reaction at a low temperature, which is also a feature of the present invention, the reaction can be extremely concentrated, so that the energy cost can be suppressed to a low level. Moreover, since the high reaction concentration and washing are not required, a high yield of the product can be expected.

<Function>

In the present embodiment, the sodium ferrite particle powder containing at least one metal or more selected from silicon, aluminum, titanium, manganese, cobalt, nickel, magnesium, copper and zinc in an amount of more than 1% by weight and 20% by weight or less in terms of the oxide had an excellent performance of adsorbing carbon dioxide in a gas, confining it in a solid, and removing it. It is presumed that this is because silicon, aluminum, titanium, manganese, cobalt, nickel, magnesium, copper, and zinc contained in the sodium ferrite particle powder were solid-solved in the generated sodium ferrite particles or were present on the surface of the particles, while inhibited the crystal growth of the sodium ferrite particles and helped to make the sodium ferrite particles uniform and finer. Furthermore, it is presumed that the metal has a catalytic action, which significantly improves the carbon dioxide absorption ability originally possessed by sodium ferrite, and it has achieved an excellent performance capable of absorbing carbon dioxide at room temperature and discharging it to the outside of the system at 200° C. or lower. Further, it is presumed that the sodium ferrite particle powder having a high BET specific surface area and being closer to a spherical shape has become a material having excellent moldability and processability while maintaining the original carbon dioxide absorption performance.

Next, a method for producing a sodium ferrite particle powder according to another embodiment of the present invention will be described.

The sodium ferrite particle powder according to the present embodiment can also be obtained by mixing a particle powder made of the sodium raw material with an iron oxide particle powder containing at least one metal or more selected from the metal group consisting of silicon, aluminum, titanium, manganese, cobalt, nickel, magnesium, copper and zinc in the form of an oxide, and reacting them at a temperature of 150 to 500° C. in the solid phase.

When the iron oxide particle powder metal-treated with the above-mentioned metal oxide and the particle powder made of the sodium raw material were subjected to a solid-phase reaction, the contained metal component tended to suppress the growth of the primary particles of sodium ferrite. Therefore, it becomes a particle powder having a large BET specific surface area, which is preferable as a fixing recovery material for carbon dioxide. Further, as a characteristic of the solid phase reaction, the crystal growth of sodium ferrite tends to be isotropic, so that the axial ratio of the primary particles tends to be suppressed.

The amount of the metal such as silicon, aluminum, titanium, manganese, cobalt, nickel, magnesium, copper and zinc that are metal-treated with iron oxide is preferably 0.05 to 5% by weight in terms of the oxide with respect to the iron oxide. This is because, as described above, the carbon dioxide fixing recovery performance may be improved in some cases. The content of the metal is preferably 0.1 to 4% by weight, and further preferably 0.15 to 3% by weight.

For the iron oxide particle powder, hematite, magnetite, maghemite, and goethite can be used. In order to contain a large amount of the crystal phase of α-sodium ferrite, magnetite and maghemite having a spinel structure in which oxygen hexagonal lattices have a pattern of . . . ABCABC . . . which is the same as the crystal phase of α-sodium ferrite are preferable (Reference: Shoichi Okamoto, "Crystal Formation and Phase Transition of Sodium Orthoferrite", Nagaoka University of Technology, Research Report No. 8 (1986), pp. 37-42).

The shape of the iron oxide particle powder can be selected from needle shape, spindle shape, spherical shape, tetrahedron, hexahedron, and octahedron.

As the particle size of the iron oxide particle powder, any size from 10 nm to 1 μm can be selected.

As the particle powder of the sodium raw material, sodium nitrite, sodium sulfate, sodium carbonate, sodium hydrogen carbonate, and sodium hydroxide can be used. However, considering industrial use, sodium nitrite and sodium sulfate, which may generate toxic nitrite gas or sulfurous acid gas during production should be avoided.

In general, the solid phase reaction is a synthetic method in which a solid and a solid are mixed and the elements are moved and reacted without a solvent. Since no solvent is used as a reaction mother liquor, wastes such as a solvent when used for the liquid phase reaction can be suppressed. Further, in the case of the solid phase reaction at a low temperature, which is also a feature of the present invention, the reaction can be extremely concentrated, so that the energy cost can be suppressed to a low level. Moreover, since the high reaction concentration and washing are not required, a high yield of the product can be expected.

<Function>

In the present embodiment, the sodium ferrite particle powder containing at least one metal or more selected from silicon, aluminum, titanium, manganese, cobalt, nickel, magnesium, copper and zinc in an amount of 0.05 to 1% by weight in terms of the oxide further had an excellent property of adsorbing carbon dioxide in a gas, confining it in a solid, and releasing carbon dioxide by heating. It is presumed that this was because silicon, aluminum, titanium, manganese, cobalt, nickel, magnesium, copper, and zinc contained in the iron oxide particle powder as a raw material were solid-solved in the generated sodium ferrite particles or were present on the surface of the particles, while inhibited the crystal growth of the sodium ferrite particles and helped to make the sodium ferrite particles uniform and finer. Furthermore, it is presumed that the metal has a catalytic action, which significantly improves the carbon dioxide fixing recovery ability originally possessed by sodium ferrite, and it has achieved an excellent performance capable of fixing carbon dioxide in a temperature range from room temperature to 100° C. and recovering it at 200° C. or lower. Further, it is presumed that by using a sodium ferrite particle powder closer to sphere having a high BET specific surface area in addition to the above features, a material having excellent moldability and processability while maintaining the original carbon dioxide fixing recovery performance can be obtained.

EXAMPLES

Typical embodiments of the present invention are as follows.

Analysis of elements (excluding oxygen) in the sodium ferrite particle powder according to the present invention and their raw materials was carried out by a scanning fluorescent X-ray analyzer ZSX Primus II manufactured by Rigaku.

The % by weight of the crystal phase of the sodium ferrite particle powder according to the present invention was identified and quantified by a fully automatic multipurpose X-ray diffractometer D8 ADVANCE manufactured by BRUKER.

The BET specific surface area of the sodium ferrite particle powder according to the present invention was measured by the BET method using nitrogen using Multisorb-16 manufactured by QUANTA CHROME.

The major axis diameters and minor axis diameters of primary particles of the sodium ferrite particle powder according to the present invention were measured for 350 primary particles that shown in the micrograph by a scanning electron microscope S-4800 manufactured by Hitachi High-Tech Corporation, and the values of the average major axis diameter and the average minor axis diameter of the primary particles are shown.

The axial ratio of the sodium ferrite particle powder according to the present invention is shown as the ratio of the average major axis diameter to the average minor axis diameter (average major axis diameter/average minor axis diameter).

The average primary particle diameter of the sodium ferrite particle powder according to the present invention is shown as the average value of the average major axis diameter and the average minor axis diameter.

For the powder pH value of the sodium ferrite particle powder according to the present invention, 5 g of a sample was weighed in a 300 ml Erlenmeyer flask, 100 ml of boiled pure water was added to this, it was heated to maintain the boiling state for about 5 minutes, then, the flask was plugged and allowed to cool to room temperature, water corresponding to weight loss was added and the flask was plugged again, and the content was shaken for 1 minute, and allowed to stand still for 5 minutes, then, the pH of the resultant supernatant was measured according to JIS Z8802-7, and the obtained value was taken as the powder pH value.

For the carbon dioxide fixing recovery ability of the sodium ferrite particle powder according to the present invention, 100 mg of a sample was placed on a combustion boat and placed in an acrylic pipe equipped with an inlet/outlet pipe, and a (carbon dioxide+nitrogen) mixed gas adjusted to a humidity range of 20 to 100% and a carbon dioxide concentration range of 1 to 100 vol % was introduced at 500 mL/min from the inlet, and for obtaining the adsorption amount of carbon dioxide after 2 hours, the sample was heated from room temperature to 200° C. by a differential heat thermogravimetric simultaneous measuring device STA7000 manufactured by Hitachi High-Tech Corporation, and the carbon dioxide absorption and discharge amount was determined from the heat loss.

To evaluate the dispersibility of the sodium ferrite particle powder according to the present invention, 10 parts by weight of the sodium ferrite powder was weighed, and 1 part by weight of alkylamine, 89 parts by weight of propylene glycol monomethyl ether acetate, and 100 parts by weight of 1.5 mm glass beads were added. Then, the mixture was shaken with a paint conditioner for 2 hours, and the glass beads were separated and removed from the slurry. The dispersed particle size of the obtained slurry was measured by a concentrated particle size analyzer FPAR1000 manufactured by Otsuka Electronics. When the cumulative 50% value (D50) of the scattering intensity distribution was 2 times or less of the average primary particle size, it was judged as a sample with good dispersibility and was evaluated as "○", and when it was more than 2 times, it was evaluated as "x".

<Production Method of Iron Oxide Particle Powder Used as Raw Material for Sodium Ferrite Particle Powder>

Iron oxide 1 (100ED manufactured by Toda Kogyo Corp., hematite, specific surface area 11 $m^2/g$)(1000 parts by weight) was added to and mixed with 10,000 parts by weight of pure water, and sodium hydroxide was added to the obtained suspension to adjust pH to 11. After that, No. 3 water glass (manufactured by Tokuyama Corporation, the amount of Si in the water glass which is a high-concentration sodium silicate aqueous solution corresponds to 29% by weight in terms of $SiO_2$)(17.2 parts by weight)(corresponding to 0.5% by weight in terms of $SiO_2$, with respect to the iron oxide 1) was added, and then the mixture was stirred and mixed. Then, sulfuric acid was added to the suspension to adjust the pH to 9, and a $SiO_2$ film was deposited on the surface of the iron oxide 1 particles in the suspension. Then, the obtained suspension was filtered, and $Na^+$ ion and $SO_4^{2-}$ ion which could be impurities were washed with water and dried to obtain treated iron oxide 1. As a result of fluorescent X-ray analysis, the amount of $SiO_2$ present on the surface of the obtained treated iron oxide 1 was 0.25% by weight in terms of $SiO_2$.

A treatment was carried out in the same manner as in the above-described metal treatment except that the type, the shape and the BET specific surface area of the iron oxide particles used, and the type and the addition amount of the metal treatment agent were changed, to obtain treated iron oxides 2 to 9 treated with metals.

Table 1 shows various characteristics of the obtained treated iron oxides 1 to 9. Here, the addition amounts and coating amounts of the metal treatment agents: sodium silicate, aluminum sulfate, titanium chloride, cobalt sulfate, nickel sulfate, copper sulfate and zinc sulfate are listed in Table 1, as $SiO_2$, $Al_2O_3$, $TiO_2$, $CoO$, $NiO$, $CuO$ and $ZnO$, respectively. Subsequently, sodium ferrite particle powders were produced from the obtained treated iron oxides 1 to 9 as a raw material.

0.18% by weight as a heterogeneous oxide $SiO_2$. Further, the obtained powder was found to be composed of 95% by weight of α-sodium ferrite crystal phase, 4% by weight of β-sodium ferrite crystal phase and 1% by weight of γ-$Fe_2O_3$ crystal phase, according to quantification of the powder X-ray diffraction pattern. Therefore, it is presumed that the heterogeneous oxide $SiO_2$ is amorphous or is solid-solved in each crystal phase as Si.

In order to investigate the carbon dioxide fixing recovery performance of the obtained sodium ferrite particle powder, 1.00 parts by weight of a sample was placed on a No. 2 combustion boat (12×60×9 mm) and aerated through 500 mL/min of model combustion exhaust gas for 3 hours. Generally, the exhaust gas when fuel is burned in the atmosphere is composed of a maximum of 80 vol % nitrogen, 20 vol % carbon dioxide, and 80 to 100% humidity.

TABLE 1

| | | | | | | metal treatment of iron oxide particle | | | |
| | | | | | | metal treatment agent | | metal-coated product | |
| name of metal-treated iron oxide | name of iron oxide | iron oxide particle type | shape | BET ($m^2$/g) | type | addition amount (in termes of oxide) (% by weight) | | coated type | amount (% by weight) |
|---|---|---|---|---|---|---|---|---|---|
| treated iron oxide 1 | iron oxide 1 | hematite | granular | 11 | sodium silicate | 0.5 | | $SiO_2$ | 0.25 |
| treated iron oxide 2 | iron oxide 2 | hematite | granular | 7 | aluminum sulfate | 1.5 | | $Al_2O_3$ | 1.20 |
| treated iron oxide 3 | iron oxide 3 | magnetite | sphere | 4 | titanium chloride | 1.0 | | $TiO_2$ | 0.82 |
| treated iron oxide 4 | iron oxide 4 | magnetite | sphere | 10 | manganese sulfate | 0.5 | | MnO | 0.28 |
| treated iron oxide 5 | iron oxide 4 | magnetite | sphere | 10 | cobalt sulfate | 0.2 | | CoO | 0.12 |
| treated iron oxide 6 | iron oxide 4 | magnetite | sphere | 10 | nickel sulfate | 0.2 | | NiO | 0.15 |
| treated iron oxide 7 | iron oxide 4 | magnetite | sphere | 10 | copper sulfate | 0.1 | | CuO | 0.07 |
| treated iron oxide 8 | iron oxide 4 | magnetite | sphere | 10 | zinc sulfate | 0.1 | | ZnO | 0.07 |
| treated iron oxide 9 | iron oxide 5 | goethite | needle | 20 | sodium silicate + aluminum sulfate | 0.5 + 0.5 | | $SiO_2$ + $Al_2O_3$ | 0.25 + 0.15 |

<Production Method of Sodium Ferrite Particle Powder>

Example 1

The particles of the treated iron oxide 1 obtained above were weighed (10 parts by weight), whereas a sodium hydroxide particle powder as a sodium raw material was weighed so as to have Na/Fe=1.0 (molar ratio). After mixing the raw materials, they were pulverized with mixing in a sample mill. This mixed pulverized product was placed in a crucible and subjected to a solid phase reaction at 400° C. for 16 hours. Then, it cooled to room temperature and pulverized with a sample mill to obtain a sodium ferrite particle powder. The BET specific surface area of the obtained particle powder was 3.0 $m^2$/g. According to quantification of the primary particles by a scanning electron microscope, the average major axis diameter was 0.7 μm, the average minor axis diameter was 0.4 μm, the average particle diameter was 0.5 μm, and the axial ratio was 1.6. The powder pH was relatively high at 13.8.

Analysis of elements contained in the resultant sodium ferrite particle powder was performed by fluorescent X-ray, as a result, the molar ratio of Na/Fe was 1.0, which was almost the same as the charging ratio of the raw materials, and the silicon component was contained in an amount of Therefore, at room temperature of 25° C., 400 mL/min of nitrogen and 100 mL/min of carbon dioxide were mixed and bubbled into water to obtain a model combustion exhaust gas having 20 vol % carbon dioxide and 80% relative humidity.

The sample after aeration was weighed (10 mg), and heated to 200° C. at 10° C./min while being aerated with dry air at 300 mL/min using a thermogravimetric measuring device, and the desorption temperature and desorption amount of carbon dioxide adsorbed on the sample were measured. FIG. 1 shows a measurement chart with the horizontal axis as the sample temperature. The TG curve showed the % by weight of the residual sample at each temperature when the initial value was 100% by weight, and the decrease in the sample was considered to be due to the release of carbon dioxide. The DTG curve is a differential curve of the TG curve, and the temperature at which the maximum value of the DTG curve is taken is regarded as the carbon dioxide desorption temperature. The DTA curve showed a downwardly convex curve, and it was found that the endothermic reaction was carried out at around 114° C. When this was regarded as a thermal decomposition reaction of $NaHCO_3$ and quantified, the desorption temperature of carbon dioxide was 114° C., and the desorption amount of carbon dioxide was 18% by weight with respect to the sample solid content, thus, excellent carbon dioxide fixing recovery performance became clear.

Further, when the sample after aeration was reprepared and the weight was measured, it was 1.30 parts by weight, and an increase in mass of 30% by weight was confirmed. When the X-ray diffraction of this sample was measured, 70% by weight of $Na_{1-x}FeO_2$ and 30% by weight of $NaHCO_3$ were confirmed, and it was found that carbon dioxide was fixed on the sodium ferrite particle powder. Further, this sample was heated in an electric furnace at 120° C. for 1 hour, and the weight was measured to be 1.12 parts by weight, thus, it was found that 0.18 parts by weight (18% by weight with respect to $NaFeO_2$ solid content) of carbon dioxide could be adsorbed and desorbed in this cycle. When the X-ray diffraction of this sample was measured, 90% by weight of $NaFeO_2$ and 10% by weight of $Na_2CO_3$ were confirmed. Further, when carbon dioxide was brought into contact with this sample in the same manner as described above, the amount was increased to 1.30 parts by weight, and when heated, the amount was reduced to 1.12 parts by weight, and 0.18 parts by weight of carbon dioxide could be absorbed and desorbed. This operation was repeated 10 times, and it was confirmed that there was no change in the mass increase and decrease. From this, it was clarified that the obtained sodium ferrite particle powder was excellent in the fixing recovery performance of carbon dioxide, particularly in repeatability.

When the dispersibility of the obtained sodium ferrite particle powder was evaluated, the dispersed particle size was within twice the average primary particle size, which was good.

Examples 2-9

The sodium ferrite particle powder according to the present invention was obtained in the same manner as in Example 1 except that the type of the metal-treated iron oxide fine particles and the type of the sodium source were variously changed.

Table 2 shows the production conditions in Examples 1 to 9, Table 3 shows various characteristics of the obtained sodium ferrite particle powder, and Table 4 shows the carbon dioxide fixing recovery performance and dispersibility thereof. For samples with good dispersibility, those with a dispersed particle size within twice the average primary particle size were marked with ○, and those with a dispersed particle size exceeding 2 times were marked with x.

Comparative Example 1

The iron oxide 1 was weighed (10 parts by weight), whereas a sodium hydroxide particle powder was weighed so that Fe:Na=1:1 (molar ratio), and 100 parts by weight of pure water was added to dissolve the sodium hydroxide particle powder, and they were kneaded for 2 hours in an automatic mortar. This was dried at 80° C. for 2 hours, and pulverized with mixing in a sample mill. This mixed pulverized product was placed in a crucible and heat-treated at 400° C. for 2 hours. The product was found by powder X-ray diffraction to be 25% by weight of the α-sodium ferrite crystal phase and the remaining 75% by weight of the γ-$Fe_2O_3$ crystal phase. The BET specific surface area was 1.0 $m^2/g$. The axial ratio was 3.8. Further, when the carbon dioxide fixing recovery performance was examined in the same manner as in Example 1, the temperature was raised to 200° C., but the desorption of carbon dioxide could not be confirmed.

The production conditions of Comparative Example 1 are shown in Table 2, the properties of the obtained sodium ferrite particle powder are shown in Table 3, and the carbon dioxide fixing recovery performance and dispersibility thereof are shown in Table 4.

TABLE 2

| | iron oxide raw material | | raw material charging | calcination | |
| | type | sodium raw material | Na/Fe (molar ratio) | Temperature (° C.) | Time (hr) |
|---|---|---|---|---|---|
| Example 1 | treated iron oxide 1 | sodium hydroxide | 1.0 | 400 | 16 |
| Example 2 | treated iron oxide 2 | sodium hydroxide | 1.1 | 400 | 16 |
| Example 3 | treated iron oxide 3 | sodium hydroxide | 1.2 | 300 | 16 |
| Example 4 | treated iron oxide 4 | sodium hydroxide | 0.9 | 300 | 16 |
| Example 5 | treated iron oxide 5 | sodium oxide | 0.8 | 200 | 16 |
| Example 6 | treated iron oxide 6 | sodium carbonate | 1.0 | 400 | 16 |
| Example 7 | treated iron oxide 7 | sodium carbonate | 1.0 | 400 | 16 |
| Example 8 | treated iron oxide 8 | sodium oxide | 1.0 | 400 | 16 |
| Example 9 | treated iron oxide 9 | sodium hydroxide | 1.0 | 400 | 16 |
| Comparative Example 1 | iron oxide 1 | sodium hydroxide | 1.0 | 400 | 16 |

TABLE 3

| | heterogeneous oxide contained | | | | | primary particle | | | | | | |
| | type | content (% by weight) | powder pH | BET ($m^2$/g) | Na/Fe (molar ratio) | major axis diameter (μm) | minor axis diameter (μm) | axis ratio (average major axis diameter/ average minor axis diameter) | average primary particle diameter (μm) | crystal phase | | |
| | | | | | | | | | | α-NaFeO2 (% by weight) | β-NaFeO2 (% by weight) | γ-Fe2O3 (% by weight) |
|---|---|---|---|---|---|---|---|---|---|---|---|---|
| Example 1 | $SiO_2$ | 0.18 | 13.8 | 3.0 | 1.0 | 0.7 | 0.4 | 1.6 | 0.57 | 95 | 4 | 1 |
| Example 2 | $Al_2O_3$ | 0.84 | 12.8 | 2.7 | 1.1 | 0.6 | 0.5 | 1.2 | 0.55 | 80 | 19 | 1 |

TABLE 3-continued

| | heterogeneous oxide contained | | powder pH | BET ($m^2/g$) | Na/Fe (molar ratio) | primary particle | | | | crystal phase | | |
|---|---|---|---|---|---|---|---|---|---|---|---|---|
| | type | content (% by weight) | | | | average major axis diameter (μm) | average minor axis diameter (μm) | axis ratio (average major axis diameter/ average minor axis diameter) | average primary particle diameter (μm) | α-NaFeO2 (% by weight) | β-NaFeO2 (% by weight) | γ-Fe2O3 (% by weight) |
| Example 3 | $TiO_2$ | 0.59 | 13.4 | 2.2 | 1.2 | 0.8 | 0.5 | 1.8 | 0.63 | 75 | 24 | 1 |
| Example 4 | MnO | 0.20 | 11.8 | 5.3 | 0.9 | 0.4 | 0.2 | 1.8 | 0.28 | 92 | 6 | 2 |
| Example 5 | CoO | 0.08 | 13.3 | 4.2 | 0.8 | 0.4 | 0.3 | 1.3 | 0.35 | 94 | 2 | 4 |
| Example 6 | NiO | 0.10 | 12.8 | 5.2 | 1.0 | 0.4 | 0.3 | 1.3 | 0.36 | 90 | 3 | 7 |
| Example 7 | CuO | 0.05 | 13.4 | 4.8 | 1.0 | 0.4 | 0.3 | 1.3 | 0.36 | 93 | 4 | 3 |
| Example 8 | ZnO | 0.06 | 13.3 | 4.4 | 1.0 | 0.4 | 0.3 | 1.4 | 0.34 | 89 | 3 | 8 |
| Example 9 | $SiO_2$ + $Al_2O_3$ | 0.20 + 0.12 | 12.9 | 2.5 | 1.0 | 0.7 | 0.5 | 1.4 | 0.60 | 92 | 5 | 3 |
| Comparative Example 1 | — | — | 12.1 | 1.0 | 1.0 | 2.3 | 0.6 | 3.8 | 1.45 | 25 | nd | 75 |

TABLE 4

| | CO2 recovery temperature (° C.) | CO2 recovery amount (% by weight) | dispersed particle diameter (μm) | dispersed particle diameter/average primary particle diameter | dispersibility |
|---|---|---|---|---|---|
| Example 1 | 114 | 18 | 0.6 | 1.2 | ○ |
| Example 2 | 113 | 15 | 0.8 | 1.3 | ○ |
| Example 3 | 110 | 10 | 0.9 | 1.5 | ○ |
| Example 4 | 112 | 18 | 0.5 | 1.2 | ○ |
| Example 5 | 110 | 18 | 0.4 | 1.1 | ○ |
| Example 6 | 113 | 18 | 0.5 | 1.4 | ○ |
| Example 7 | 114 | 18 | 0.4 | 1.1 | ○ |
| Example 8 | 114 | 18 | 0.4 | 1.2 | ○ |
| Example 9 | 118 | 12 | 0.9 | 1.5 | ○ |
| Comparative Example 1 | — | nd | precipitated unmeasurable | × | × |

Example 10

Iron oxide fine particles 10 (100ED manufactured by Toda Kogyo Corp., hematite, specific surface area 11 $m^2/g$) were weighed (10 parts by weight), whereas a sodium hydroxide particle powder as a sodium raw material was weighed so that Na/Fe=1.0 (molar ratio), and hydrotalcite (manufactured by Toda Kogyo Corp., specific surface area 10 $m^2/g$) was weighed (1 part by weight) and added. The raw materials were mixed, then, pulverized with mixing in a sample mill. This mixed pulverized product was placed in a crucible and subjected to a solid phase reaction at 400° C. for 16 hours. Then, it cooled to room temperature and pulverized with a sample mill to obtain a sodium ferrite particle powder. The BET specific surface area of the obtained particle powder was 4.0 $m^2/g$. According to quantification of the primary particles by a scanning electron microscope, the average major axis diameter was 0.7 μm, the average minor axis diameter was 0.4 μm, the average particle diameter was 0.55 μm, and the axial ratio was 1.8. The powder pH was relatively high at 13.8.

When the analysis of elements contained in the obtained sodium ferrite particle powder was performed by fluorescent X-ray, the Na/Fe molar ratio was 1.0, which was almost the same as the raw material charging ratio, and the amount of MgO was 6.0% by weight and $Al_2O_3$ was 3.5% by weight, that is, the amount of the heterogeneous metal oxides was 9.5% by weight. Furthermore, according to quantification of the obtained powder X-ray diffraction pattern, it was found that 76% by weight was composed of β-sodium ferrite crystal phase, 11% by weight was composed of α-sodium ferrite crystal phase and 8% by weight was composed of γ-$Fe_2O_3$ crystal phase. Therefore, it is presumed that the heterogeneous oxides MgO and $Al_2O_3$ are in an amorphous state or are solid-solved in each crystal phase as Mg and Al.

The carbon dioxide absorption evaluation of the obtained sodium ferrite particle powder was performed as follows. First, carbon dioxide was introduced into a desiccator (13 L) to create a model unpleasant indoor environment with a carbon dioxide concentration of 4000 ppm and a humidity of 80% at room temperature of 25° C. and sealed. Next, 10 g of the sodium ferrite particle powder was quickly put into a desiccator (13 L), and the carbon dioxide concentration after 30 minutes was measured with a carbon dioxide densitometer. The carbon dioxide concentration after 30 minutes was 1 ppm or less, which is the detection limit of the carbon dioxide concentration, indicating excellent carbon dioxide absorption performance.

In order to examine the amount of carbon dioxide desorbed from the obtained sodium ferrite particle powder, 100 mg of a sample was placed on a No. 2 combustion boat (12×60×9 mm) and aerated through 500 mL/min of model combustion exhaust gas for 3 hours. Generally, the exhaust gas when fuel is burned in the atmosphere is composed of a maximum of 80 vol % nitrogen, 20 vol % carbon dioxide, and 80 to 100% humidity. Therefore, at room temperature of 25° C., 400 mL/min of nitrogen and 100 mL/min of carbon dioxide were mixed and bubbled into water to obtain a model combustion exhaust gas having 20 vol % carbon dioxide and 80% relative humidity.

Figure 2:
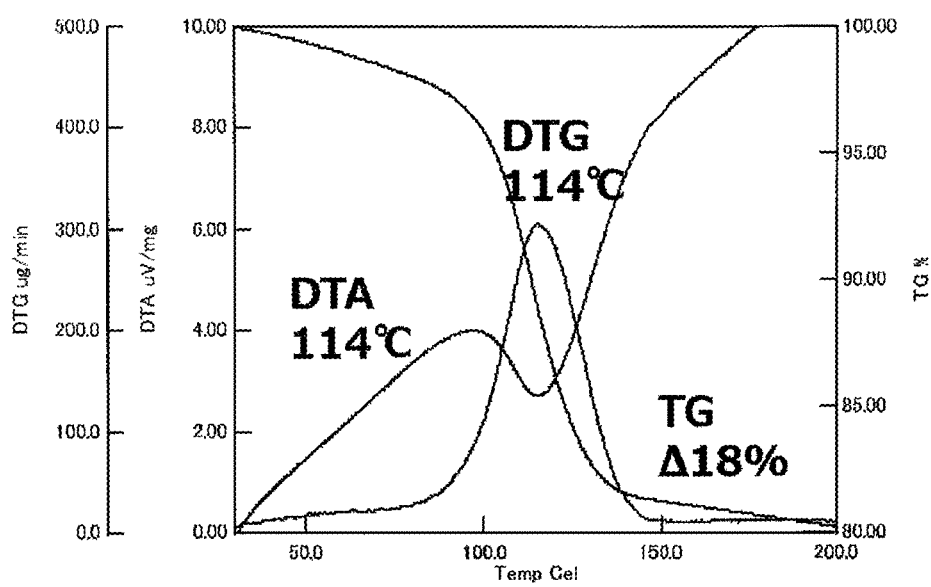
FIG. 2 is a result of thermogravimetric analysis after fixing carbon dioxide with the sodium ferrite particle powder obtained in Example 10.

The sample after aeration was weighed (10 mg), and heated to 200° C. at 10° C./min while being aerated with dry air at 300 mL/min using a thermogravimetric measuring device, and the desorption temperature and desorption amount of carbon dioxide adsorbed on the sample were measured. FIG. 2 shows a measurement chart with the horizontal axis as the sample temperature. The TG curve showed the % by weight of the residual sample at each temperature when the initial value was 100% by weight, and the decrease in the sample was considered to be due to the release of carbon dioxide. The DTG curve is a differential curve of the TG curve, and the temperature at which the maximum value of the DTG curve is taken is regarded as the carbon dioxide desorption temperature. The DTA curve showed a downwardly convex curve, and it was found that the endothermic reaction was carried out at around 114° C. When this was regarded as a thermal decomposition reaction of $NaHCO_3$ and quantified, the desorption temperature of carbon dioxide was 114° C., and the desorption amount of carbon dioxide was 18% by weight with respect to the sample solid content, thus, excellent carbon dioxide discharge performance became clear.

When the dispersibility of the obtained sodium ferrite particle powder was evaluated, the dispersed particle size was within twice the average primary particle size, which was good.

Examples 11-14

The sodium ferrite particle powder according to the present invention was obtained in the same manner as in Example 10 except that the type of iron oxide fine particles, the type of sodium source, the type of metal compound and the amount of addition were variously changed.

Table 5 shows the production conditions in Examples 10 to 14, various characteristics of the obtained sodium ferrite particle powder are shown in Table 6, and the carbon dioxide absorption/discharge performance and dispersibility are shown in Table 7. For the carbon dioxide absorption evaluation, 10 g of carbon dioxide absorbent was put in a desiccator (13 L) having a carbon dioxide concentration of 4000 ppm, and those having a carbon dioxide concentration of 2500 ppm or less after 30 minutes were marked with ○, and those having a carbon dioxide concentration of more than 2500 ppm were marked with x. For samples with good dispersibility, those with a dispersed particle size within twice the average primary particle size were marked with ○, and those with a dispersed particle size exceeding 2 times were marked with x.

Comparative Example 2

The iron oxide 10 was weighed (10 parts by weight), whereas a sodium hydroxide particle powder was weighed so that Fe/Na=1:0 (molar ratio), and 100 parts by weight of pure water was added to dissolve the sodium hydroxide particle powder, and they were kneaded for 2 hours in an automatic mortar. This was dried at 80° C. for 2 hours, and pulverized with mixing in a sample mill. This mixed pulverized product was placed in a crucible and heat-treated at 400° C. for 2 hours. The product was found by powder X-ray diffraction to be 25% by weight of the α-sodium ferrite crystal phase and the remaining 75% by weight of the $\gamma$-$Fe_2O_3$ crystal phase. The BET specific surface area was 1.0 $m^2/g$. The axial ratio was 3.8. Moreover, when the carbon dioxide absorption/discharge performance was examined in the same manner as in Example 10, the temperature was raised to 200° C., but the desorption of carbon dioxide could not be confirmed.

Table 5 shows the production conditions of Comparative Example 2, Table 6 shows various characteristics of the obtained sodium ferrite particle powder, and Table 7 shows the carbon dioxide absorption/discharge performance and dispersibility.

TABLE 5

| | iron oxide particle | | | | raw material charging | | heterogeneous metal oxide | | calcination | |
|---|---|---|---|---|---|---|---|---|---|---|
| | name of iron oxide | type | shape | BET | sodium raw material | Na/Fe (molar ratio) | type | addition amount (% by weight vs iron oxide) | Temperature (° C.) | Time (hr) |
| Example 10 | iron oxide 10 | hematite | granular | 11 | sodium hydroxide | 1.0 | hydrotalcite | 10 | 400 | 16 |
| Example 11 | iron oxide 11 | hematite | granular | 7 | sodium hydroxide | 1.1 | alumina | 20 | 400 | 16 |
| Example 12 | iron oxide 12 | magnetite | sphere | 4 | sodium carbonate | 1.2 | silica | 10 | 300 | 16 |
| Example 13 | iron oxide 13 | magnetite | sphere | 10 | sodium carbonate | 0.9 | titanium oxide | 5 | 300 | 16 |
| Example 14 | iron oxide 14 | goethite | needle | 20 | sodium oxide | 0.8 | zinc oxide | 5 | 200 | 16 |
| Comparative Example 2 | iron oxide 10 | hematite | granular | 11 | sodium hydroxide | 1.0 | — | — | 400 | 16 |

TABLE 6

| | heterogeneous oxide contained | | | | | primary particle | | | | crystal phase | | |
|---|---|---|---|---|---|---|---|---|---|---|---|---|
| | type | content (% by weight) | Na/Fe (molar ratio) | powder pH | BET ($m^2/g$) | average major axis diameter (μm) | average minor axis diameter (μm) | axis ratio (average major axis diameter/ average minor axis diameter) | average primary particle diameter (μm) | α-$NaFeO_2$ (% by weight) | β-$NaFeO_2$ (% by weight) | γ-$Fe_2O_3$ (% by weight) |
| Example 10 | MgO, Al2O3 | 6.0(MgO) + 3.0(Al2O3) | 1.0 | 13.8 | 4.0 | 0.7 | 0.4 | 1.8 | 0.55 | 11 | 76 | 8 |

TABLE 6-continued

| | heterogeneous oxide contained | | | | | primary particle | | | | crystal phase | | |
|---|---|---|---|---|---|---|---|---|---|---|---|---|
| | type | content (% by weight) | Na/Fe (molar ratio) | powder pH | BET ($m^2/g$) | average major axis diameter (μm) | average minor axis diameter (μm) | axis ratio (average major axis diameter/ average minor axis diameter) | avarage primary particle diameter (μm) | α-NaFeO2 (% by weight) | β-NaFeO2 (% by weight) | γ-Fe2O3 (% by weight) |
| Example 11 | Al2O3 | 18.0 | 1.1 | 12.8 | 2.7 | 0.6 | 0.5 | 1.2 | 0.55 | 33 | 62 | 5 |
| Example 12 | SiO2 | 8.2 | 1.2 | 13.4 | 2.2 | 0.8 | 0.5 | 1.8 | 0.63 | 27 | 66 | 7 |
| Example 13 | TiO2 | 4.3 | 0.9 | 11.8 | 5.3 | 0.4 | 0.2 | 1.8 | 0.28 | 42 | 53 | 5 |
| Example 14 | ZnO | 2.1 | 0.8 | 12.9 | 2.5 | 0.7 | 0.5 | 1.4 | 0.60 | 37 | 60 | 3 |
| Comparative Example 2 | — | — | 1.0 | 12.1 | 1.0 | 2.3 | 0.6 | 3.8 | 1.45 | 25 | nd | 75 |

TABLE 7

| | CO2 absorbing performance | CO2 desorbing temperature (° C.) | CO2 saturated absorption amount (% by weight) | dispersed particle diameter (μm) | dispersed particle diameter/avarage primary particle diameter | dispersibility |
|---|---|---|---|---|---|---|
| Example 10 | ○ | 114 | 18 | 0.6 | 1.1 | ○ |
| Example 11 | ○ | 113 | 15 | 0.8 | 1.5 | ○ |
| Example 12 | ○ | 110 | 10 | 0.9 | 1.4 | ○ |
| Example 13 | ○ | 112 | 18 | 0.5 | 1.8 | ○ |
| Example 14 | ○ | 118 | 12 | 0.9 | 1.5 | ○ |
| Comparative Example 2 | x | — | nd | precipitated unmeasurable | x | x |

As described above, it is clear that the sodium ferrite particle powder according to the present embodiment is a carbon dioxide fixing recovery material excellent in carbon dioxide adsorption and desorption. Further, since the particle powder is excellent in dispersibility, it is clear that the particle powder is excellent in moldability and processability.

INDUSTRIAL APPLICABILITY

The sodium ferrite particle powder according to the present invention is suitable as a material that can perform fixing recovery of carbon dioxide by adsorption and desorption with non-hazardous inorganic materials without using a dangerous substance such as an aqueous amine solution.

What is claimed is:

1. A sodium ferrite particle powder, wherein at least one metal or more selected from the metal group consisting of silicon, aluminum, titanium, manganese, cobalt, nickel, magnesium, copper and zinc is contained in an amount of 0.05 to 120% by weight in terms of the oxide, and a molar ratio of Na/Fe is 0.75 to 1.25, wherein an average diameter of primary particles of the sodium ferrite particle powder is 50 to 1000 nm.

2. A method for producing the sodium ferrite particle powder according to claim 1, the method comprising:
mixing an iron oxide fine particle powder, a particle powder comprising a sodium raw material, and at least one metal or more compound selected from the metal group consisting of silicon, aluminum, titanium, manganese, cobalt, nickel, magnesium, copper, and zinc, and reacting them at a temperature of 150 to 500° C. in a solid phase.

3. A method for producing the sodium ferrite particle powder according to claim 1, the method comprising:
mixing a particle powder comprising a sodium raw material with an iron oxide particle powder comprising at least one metal or more selected from the metal group consisting of silicon, aluminum, titanium, manganese, cobalt, nickel, magnesium, copper, and zinc in a form of an oxide, and
reacting them at a temperature of 150 to 500° C. in a solid phase.

4. A sodium ferrite particle powder, wherein at least one metal or more selected from the metal group consisting of silicon, aluminum, titanium, manganese, cobalt, nickel, magnesium, copper and zinc is contained in an amount of 0.05 to 20% by weight in terms of the oxide, and a molar ratio of Na/Fe is 0.75 to 1.25, wherein an average diameter of primary particles of the sodium ferrite particle powder is 50 to 1000 nm, wherein an axial ratio of an average major axis diameter to an average minor axis diameter of the primary particles is 1 to 2.

5. The sodium ferrite particle powder according to claim 4, wherein the at least one metal or more selected from the metal group consisting of aluminum, magnesium, silicon, titanium, and zinc is contained in an amount of more than 1% by weight and 20% by weight or less in terms of the oxide.

6. A method for producing the sodium ferrite particle powder according to claim 4, the method comprising:
mixing an iron oxide fine particle powder, a particle powder comprising a sodium raw material, and at least one metal or more compound selected from the metal group consisting of silicon, aluminum, titanium, manganese, cobalt, nickel, magnesium, copper, and zinc, and reacting them at a temperature of 150 to 500° C. in a solid phase.

7. A method for producing the sodium ferrite particle powder according to claim 4, the method comprising:

mixing a particle powder comprising a sodium raw material with an iron oxide particle powder comprising at least one metal or more selected from the metal group consisting of silicon, aluminum, titanium, manganese, cobalt, nickel, magnesium, copper, and zinc in a form of an oxide, and reacting them at a temperature of 150 to 500° C. in a solid phase.

8. A sodium ferrite particle powder, wherein at least one metal or more selected from the metal group consisting of silicon, aluminum, titanium, manganese, cobalt, nickel, magnesium, copper and zinc is contained in an amount of 0.05 to 20% by weight in terms of the oxide, and a molar ratio of Na/Fe is 0.75 to 1.25, wherein an average diameter of primary particles of the sodium ferrite particle powder is 50 to 1000 nm, wherein a pH value of the sodium ferrite particle powder is 8 to 14.

9. The sodium ferrite particle powder according to claim 8, wherein the at least one metal or more selected from the metal group consisting of aluminum, magnesium, silicon, titanium, and zinc is contained in an amount of more than 1% by weight and 20% by weight or less in terms of the oxide.

10. A method for producing the sodium ferrite particle powder according to claim 8, the method comprising:

mixing an iron oxide fine particle powder, a particle powder comprising a sodium raw material, and at least one metal or more compound selected from the metal group consisting of silicon, aluminum, titanium, manganese, cobalt, nickel, magnesium, copper, and zinc, and reacting them at a temperature of 150 to 500° C. in a solid phase.

11. A method for producing the sodium ferrite particle powder according to claim 8, the method comprising:

mixing a particle powder comprising a sodium raw material with an iron oxide particle powder comprising at least one metal or more selected from the metal group consisting of silicon, aluminum, titanium, manganese, cobalt, nickel, magnesium, copper, and zinc in a form of an oxide, and reacting them at a temperature of 150 to 500° C. in a solid phase.

* * * * *